US011120529B2

(12) United States Patent
Ida et al.

(10) Patent No.: US 11,120,529 B2
(45) Date of Patent: Sep. 14, 2021

(54) IMAGE PROCESSING APPARATUS, IMAGING APPARATUS, LENS APPARATUS, IMAGE PROCESSING METHOD, AND RECORDING MEDIUM

(71) Applicant: CANON KABUSHIKI KAISHA, Tokyo (JP)

(72) Inventors: Yoshiaki Ida, Utsunomiya (JP); Koshi Hatakeyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/180,263

(22) Filed: Nov. 5, 2018

(65) Prior Publication Data
US 2019/0139200 A1 May 9, 2019

(30) Foreign Application Priority Data
Nov. 6, 2017 (JP) .............................. JP2017-213823
Aug. 8, 2018 (JP) .............................. JP2018-149432

(51) Int. Cl.
*G06T 5/00* (2006.01)
*H04N 5/232* (2006.01)
*H04N 5/217* (2011.01)
*G06T 5/50* (2006.01)
*H04N 5/357* (2011.01)

(52) U.S. Cl.
CPC ............. *G06T 5/004* (2013.01); *G06T 5/50* (2013.01); *H04N 5/217* (2013.01); *H04N 5/23209* (2013.01); *H04N 5/3572* (2013.01); *G06T 2207/20221* (2013.01)

(58) Field of Classification Search
None
See application file for complete search history.

(56) References Cited

U.S. PATENT DOCUMENTS

| 5,081,692 A * | 1/1992 | Kwon ................. G06T 5/20 358/447 |
| 2003/0206231 A1* | 11/2003 | Chen ................. H04N 1/00137 348/207.99 |
| 2008/0204577 A1* | 8/2008 | Tsuruoka ............. G06K 9/4609 348/241 |
| 2009/0297056 A1* | 12/2009 | Lelescu ................. H04N 5/217 382/261 |
| 2015/0036946 A1* | 2/2015 | Haik ................. G06T 7/0002 382/274 |

(Continued)

FOREIGN PATENT DOCUMENTS

JP 201741763 A 2/2017

*Primary Examiner* — Quan Pham
(74) *Attorney, Agent, or Firm* — Canon U.S.A., Inc. IP Division

(57) ABSTRACT

An image processing apparatus includes a first acquisition unit configured to acquire noise information about a noise characteristic of an input image generated by image capturing using an optical system, a second acquisition unit configured to acquire a sharpening filter in a real space, the sharpening filter being based on an optical characteristic of the optical system, and a third acquisition unit configured to acquire gain information about gain of the sharpening filter using components of the sharpening filter. The image processing apparatus performs sharpening processing on the input image based on the noise information and the gain information.

14 Claims, 12 Drawing Sheets

(56) References Cited

U.S. PATENT DOCUMENTS

2015/0097993 A1\* 4/2015 Oniki .................. G06T 5/50
  348/241
2017/0032501 A1\* 2/2017 Kusumi ............... G06T 5/002

\* cited by examiner

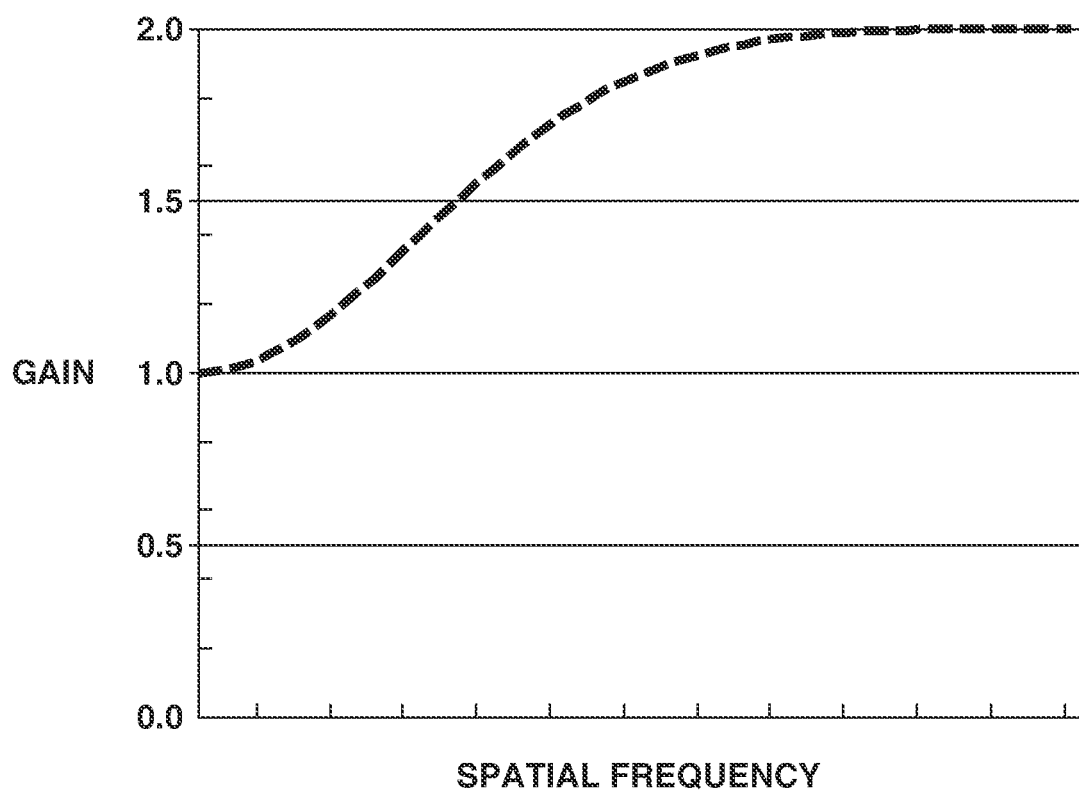

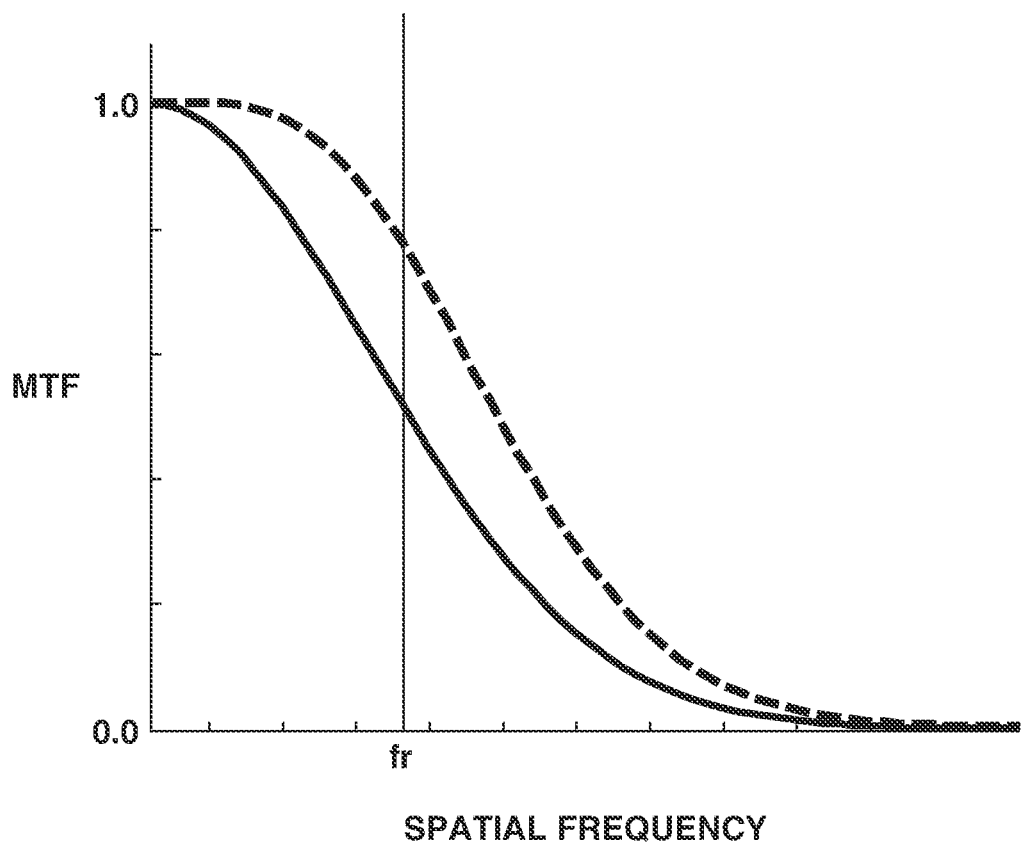

IMAGE PROCESSING APPARATUS, IMAGING APPARATUS, LENS APPARATUS, IMAGE PROCESSING METHOD, AND RECORDING MEDIUM

BACKGROUND

Field of the Disclosure

Aspects of the present disclosure generally relate to an image processing apparatus capable of improving the image quality of a captured image.

Description of the Related Art

In image capturing using an optical system, light generated from one point of a subject is affected by, for example, diffraction or aberration occurring in an optical system and then arrives at an image plane while having a minute broadening. Accordingly, blurring caused by diffraction or aberration of an optical system occurs in a captured image.

Such a blurred image is known to be able to be converted into a sharp image by image processing using, for example, the point spread function (PSF) or the optical transfer function (OTF). However, there is an issue in that attempting to perform sharpening processing on an image may cause noise in the image to be amplified.

Japanese Patent Application Laid-Open No. 2017-41763 discusses, to reduce amplification of noise when sharpening an image, adjusting a correction effect with use of information about a noise characteristic (International Organization for Standardization (ISO) sensitivity).

SUMMARY

Aspects of the present disclosure are generally directed to providing an image processing apparatus which is capable of reducing amplification of noise caused by sharpening, while reducing a processing load.

According to an aspect of the present disclosure, an image processing apparatus includes a first acquisition unit configured to acquire noise information about a noise characteristic of an input image generated by image capturing using an optical system, a second acquisition unit configured to acquire a sharpening filter in a real space, the sharpening filter being based on an optical characteristic of the optical system, and a third acquisition unit configured to acquire gain information about gain of the sharpening filter using a sum of squares of components of the sharpening filter, or configured to acquire gain information about gain of the sharpening filter in a specific frequency using components of the sharpening filter, wherein the image processing apparatus performs sharpening processing on the input image based on the noise information and the gain information.

According to another aspect of the present disclosure, an imaging apparatus includes an image sensor configured to photoelectrically convert an image formed by an optical system, and an image processing section configured to perform image processing on an input image generated by image capturing using the optical system and the image sensor, wherein the image processing section includes a first acquisition unit configured to acquire noise information about a noise characteristic of the input image, a second acquisition unit configured to acquire a sharpening filter in a real space, the sharpening filter being based on an optical characteristic of the optical system, and a third acquisition unit configured to acquire gain information about gain of the sharpening filter using a sum of squares of components of the sharpening filter, or configured to acquire gain information about gain of the sharpening filter in a specific frequency using components of the sharpening filter, and wherein the image processing section performs sharpening processing on the input image based on the noise information and the gain information.

According to yet another aspect of the present disclosure, an image processing method includes acquiring noise information about a noise characteristic in an input image generated by image capturing using an optical system, acquiring a sharpening filter in a real space, the sharpening filter being based on an optical characteristic of the optical system, acquiring gain information about gain of the sharpening filter using a sum of squares of components of the sharpening filter, or acquiring gain information about gain of the sharpening filter in a specific frequency using components of the sharpening filter, and performing sharpening processing on the input image based on the noise information and the gain information.

Further features of the present disclosure will become apparent from the following description of exemplary embodiments with reference to the attached drawings.

BRIEF DESCRIPTION OF THE DRAWINGS

FIG. 5 is a schematic diagram illustrating the gain of a sharpening filter.

FIG. 6 is a schematic diagram illustrating modulation transfer functions (MTFs) obtained before and after sharpening processing.

DESCRIPTION OF THE EMBODIMENTS

Hereinafter, an exemplary embodiment of an imaging apparatus including an image processing section serving as an image processing apparatus according to the present disclosure will be described with reference to the accompanying drawings.

The image processing section according to the present exemplary embodiment performs, on an input image generated by image capturing using an optical system, unsharp mask processing as sharpening processing using a sharpening filter that is based on an optical characteristic of the optical system. First, prior to description concerning a configuration of the imaging apparatus in the present exemplary embodiment, sharpening processing in the present exemplary embodiment is described.

Figure 1A:
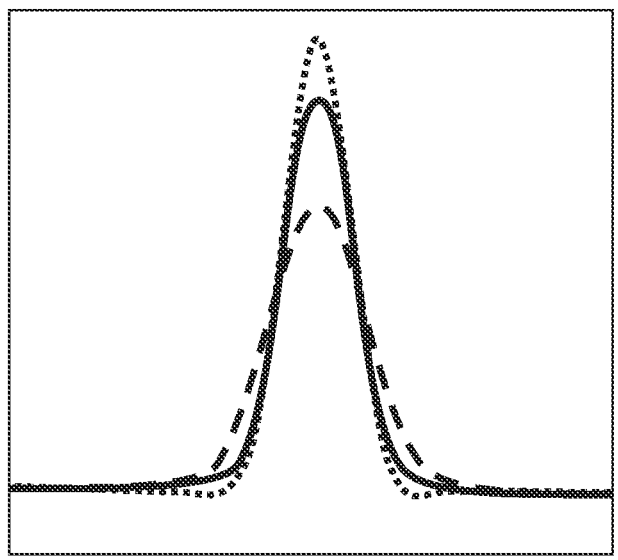
FIGS. 1A and 1B are diagrams used to explain sharpening performed with unsharp mask processing.
Figure 1B:
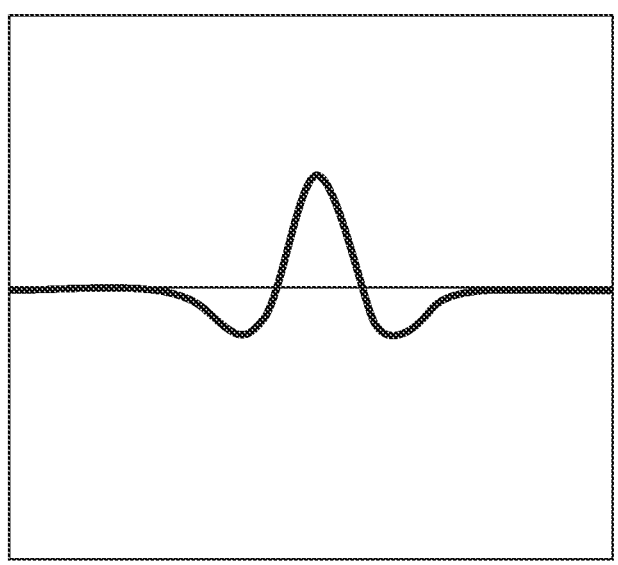

FIGS. 1A and 1B are schematic diagrams of sharpening performed with unsharp mask processing. In FIG. 1A, a solid line represents an input image, a dashed line represents an image obtained by blurring the input image with an unsharp mask, and a dotted line represents an image obtained after sharpening. Moreover, a solid line in FIG. 1B represents a correction component. In each of FIGS. 1A and 1B, the horizontal axis indicates coordinates, and the vertical axis indicates a pixel value or luminance value. FIGS. 1A and 1B are equivalent to cross-sections in a predetermined direction (for example, x-direction) in FIGS. 2A and 2B, which are described below.

When an input image is denoted by f(x, y) and a correction component is denoted by h(x, y), an image g(x, y) obtained after sharpening can be expressed by the following formula.

$$g(x,y)=f(x,y)+m\times h(x,y) \quad (1)$$

In formula (1), m is an adjustment factor for varying the intensity of correction, and the amount of correction can be adjusted by varying the value of the adjustment factor m. Furthermore, the adjustment factor m can be a given constant irrespective of the position of an input image, or the amount of correction can be adjusted according to the position of an input image by varying the adjustment factor according to the position of the input image. Moreover, the adjustment factor m(x, y) can be varied according to image capturing conditions, such as the focal length of the optical system, an aperture value, and a subject distance (image capturing distance).

When the unsharp mask is denoted by USM(x, y), the correction component h(x, y) can be expressed by the following formula. USM(x, y) is, for example, a tap value at coordinates (x, y).

$$h(x,y)=f(x,y)-f(x,y)*USM(x,y) \quad (2)$$

The right-hand side of formula (2) can be deformed in such a way as to be expressed by the following formula.

$$h(x,y)=f(x,y)*(\delta(x,y)-USM(x,y)) \quad (3)$$

Here, "*" indicates convolution (convolution integral or sum of products), and "δ(x, y)" indicates a delta function. The delta function is data which is equal in the number of taps to USM(x, y) and in which the value of the center is "1" and the values of other positions are filled with "0".

Since formula (3) can be expressed by deforming formula (2), formula (2) and formula (3) are equivalent to each other. Therefore, in the following description, generation of a correction component is described with use of formula (2). In formula (2), a difference between an input image f(x, y) and an image obtained by blurring the input image f(x, y) with an unsharp mask is obtained and a correction component h(x, y) is generated based on the obtained difference information. In common unsharp mask processing, a smoothing filter, such as a Gaussian filter, a median filter, or a moving average filter, is used as an unsharp mask.

For example, in a case where a Gaussian filter is applied as an unsharp mask to the input image f(x, y) indicated by a solid line in FIG. 1A, an image obtained by blurring the input image f(x, y) becomes as indicated by a dashed line in FIG. 1A. The correction component h(x, y) is a component indicated by a solid line in FIG. 1B, which is obtained by subtracting the dashed line in FIG. 1A from the solid line in FIG. 1A. Performing a calculation in formula (1) using the correction component calculated as mentioned above enables sharpening the input image f(x, y) indicated by the solid line in FIG. 1A as indicated by a dotted line in FIG. 1A.

Next, a case of sharpening an image by applying unsharp mask processing to an image which has been deteriorated by the influence of, for example, diffraction or aberration occurring in an optical system is described. An input image f(x, y) generated by image capturing using an optical system can be expressed by the following formula (4) when an image in which any deterioration caused by the optical system has not occurred (hereinafter referred to as an "original image") is denoted by I(x, y) and a point spread function (PSF) of the optical system is denoted by psf(x, y).

$$f(x,y)=I(x,y)*psf(x,y) \quad (4)$$

First, a case where the input image f(x, y) is an image blurred in a rotationally symmetric manner with respect to the original image I(x, y) is described. If the optical system is a rotationally symmetric coaxial optical system, a PSF corresponding to the center portion of the image becomes rotationally symmetric. Therefore, applying a rotationally symmetric unsharp mask to the central portion of the image enables performing sharpening which brings the input image f(x, y) close to the original image I(x, y). Since a difference value between an input image and an image obtained by blurring the input image with an unsharp mask is used as the correction component, to perform correction with a high degree of accuracy, it is favorable that not a simple smoothing filter but a filter having a shape closer to psf(x, y) is used as the unsharp mask.

For example, suppose a case where an input image is deteriorated by the influence of spherical aberration. While spherical aberration influences an image in a rotationally symmetric manner with respect to the center of an image plane, a smoothing filter such as a Gaussian filter differs in shape of distribution from PSFs in which the influence of spherical aberration is reflected. Therefore, using PSFs of the optical system as an unsharp mask enables correcting (sharpening) an input image with a high degree of accuracy.

Therefore, in the present exemplary embodiment, PSFs of the optical system are used as an unsharp mask USM(x, y). While the input image f(x, y) illustrated in FIG. 1A has a line-symmetric shape for ease of description, the image does not need to have an axis of symmetry. Even if the shape of the original image I(x, y) is asymmetric, as long as a degradation function (equivalent to psf(x, y)) which is convoluted into the original image I(x, y) is rotationally symmetric, the image can be sharpened with use of a rotationally symmetric unsharp mask.

Figure 2A:
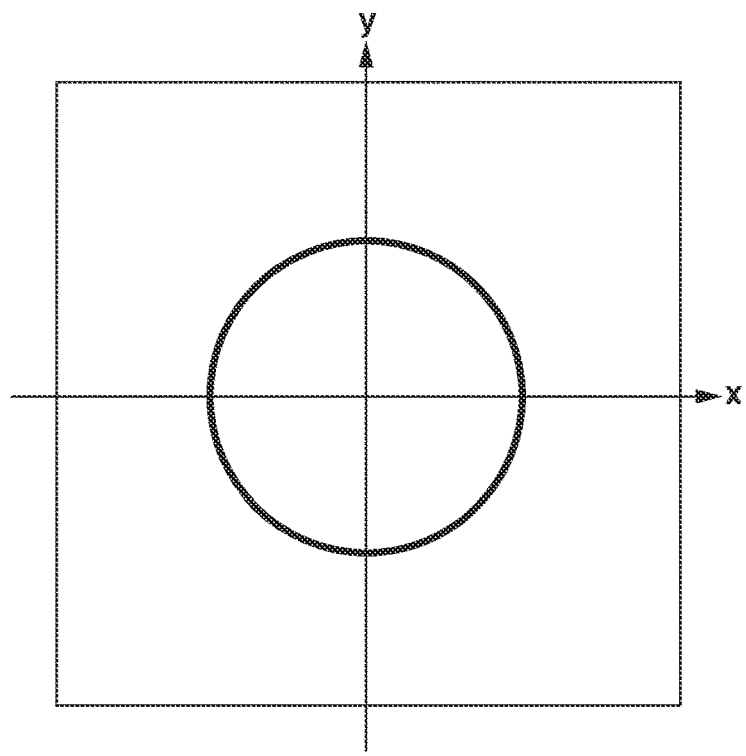
FIGS. 2A and 2B are schematic diagrams illustrating point spread functions (PSFs) of an optical system.
Figure 2B:
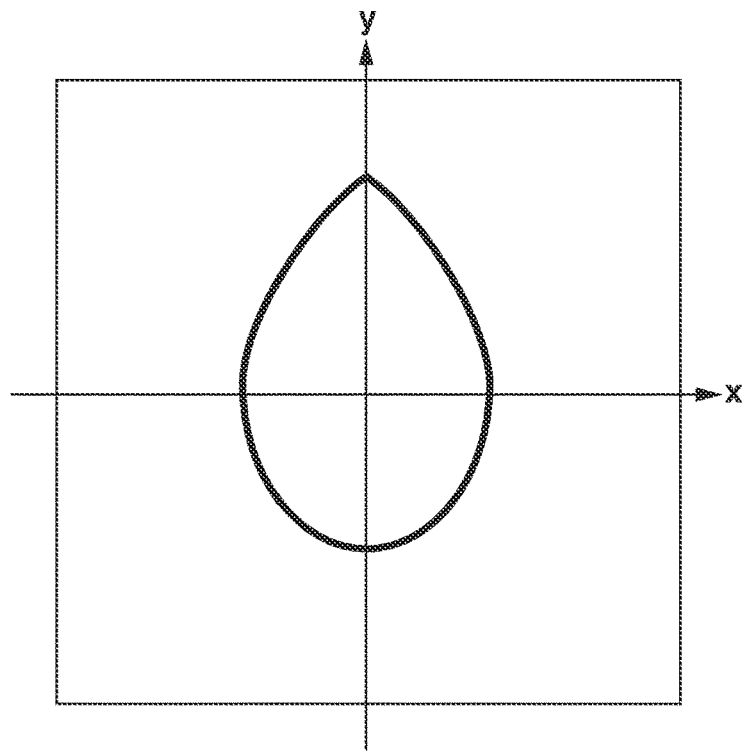

Next, a case where the input image f(x, y) is an image blurred in a rotationally asymmetric manner with respect to the original image I(x, y) is described. Even if the optical system is a rotationally symmetric coaxial optical system, PSFs corresponding to positions other than the center portion of the image usually become asymmetric in shape. FIGS. 2A and 2B are schematic diagrams of PSFs of the optical system in an xy plane, in which FIG. 2A illustrates an on-axis PSF and FIG. 2B illustrates an off-axis PSF.

For example, assuming that the original image is composed of an aggregate of ideal point images, the input image f(x, y) becomes a PSF of the optical system based on formula (4). If ideal point images are present in an angle of view corresponding to FIG. 2B and the original image has been deteriorated by the influence of the PSF of the optical system, the input mage becomes an image blurred in such a shape as illustrated in FIG. 2B. The case of performing sharpening with unsharp mask processing on an image asymmetrically blurred in this way is described.

Figure 3A:
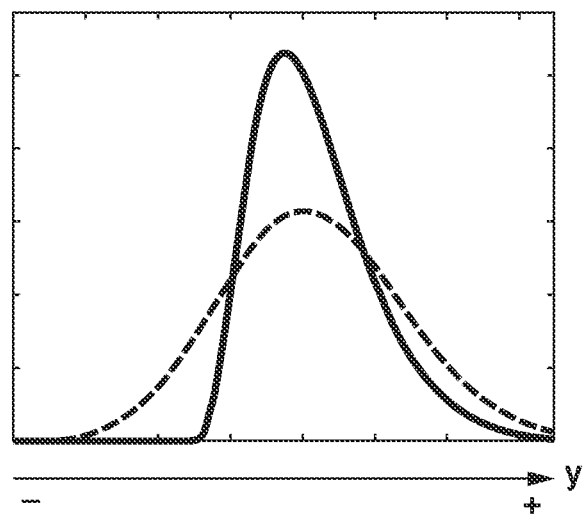
FIGS. 3A, 3B, and 3C are diagrams used to explain sharpening processing using a rotationally symmetric unsharp mask.
Figure 3B:
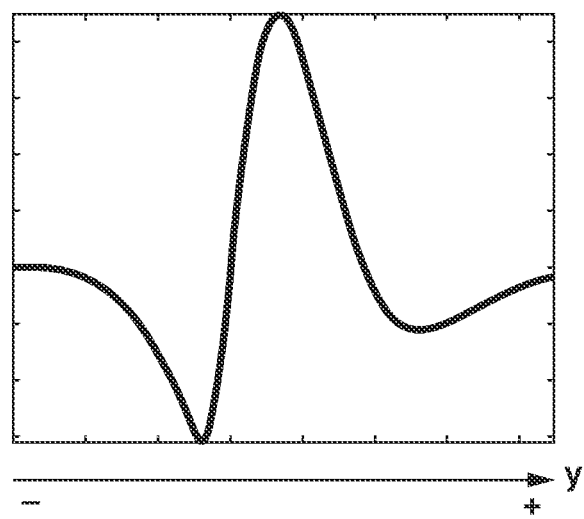
Figure 3C:
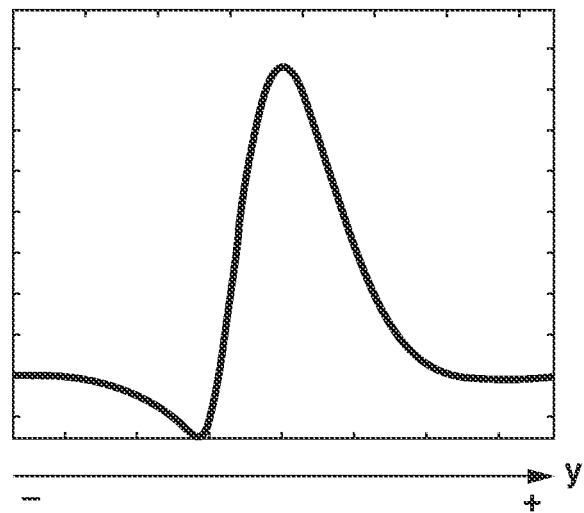
Figure 4A:
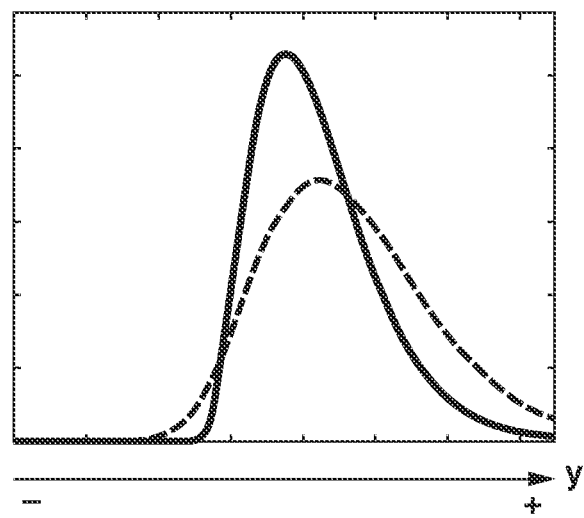
FIGS. 4A, 4B, and 4C are diagrams used to explain sharpening processing using a rotationally asymmetric unsharp mask.
Figure 4B:
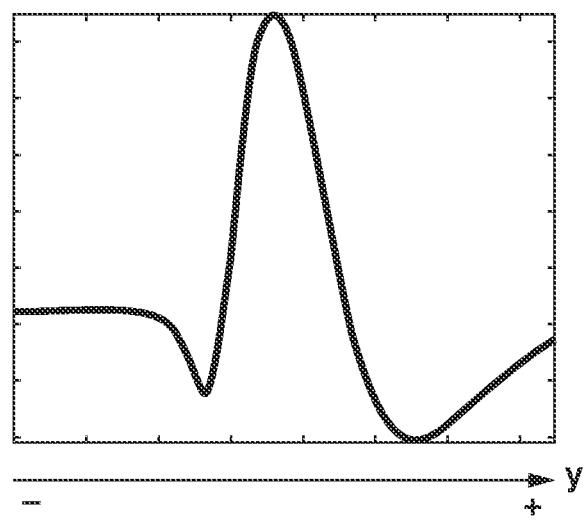
Figure 4C:
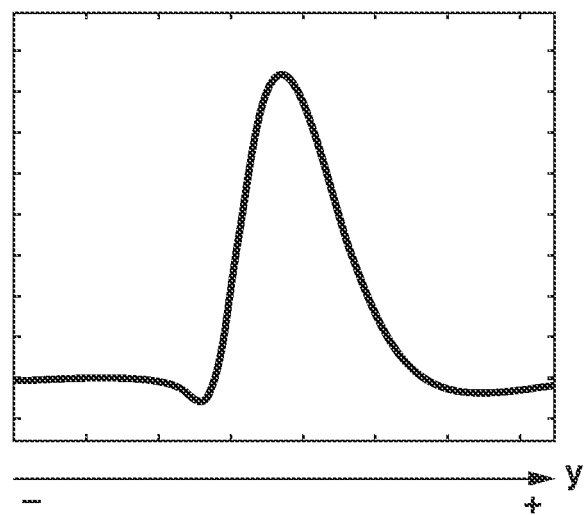

FIGS. 3A, 3B, and 3C and FIGS. 4A, 4B, and 4C are diagrams used to explain cases where unsharp mask processing has been performed on an image asymmetrically blurred. FIGS. 3A to 3C illustrate a case where unsharp mask processing has been performed with use of a rotationally symmetric unsharp mask and FIGS. 4A to 4C illustrate a case where unsharp mask processing has been performed with use of a rotationally asymmetric unsharp mask. The vertical axis in each of FIGS. 3A to 3C and FIGS. 4A to 4C indicates a pixel value or luminance value. Moreover, the horizontal axis in each of FIGS. 3A to 3C and FIGS. 4A to 4C is equivalent to the y-direction in FIG. 2B.

In FIG. 3A and FIG. 4A, a solid line represents a cross-section in the y-axis direction in FIG. 2B, and a dashed line represents an input image blurred with an unsharp mask. A Gaussian filter is applied as the rotationally symmetric unsharp mask in FIGS. 3A to 3C, and the PSF of the optical system is applied as the rotationally asymmetric unsharp mask in FIGS. 4A to 4C.

Each of FIG. 3B and FIG. 4B illustrates a component obtained by plotting difference values between the input image blurred by the corresponding unsharp mask and the input image, i.e., a correction component. In FIG. 3A and FIG. 4A, the side on which the foot of the input image is wider is assumed to be the plus side of the y-axis.

In FIG. 3A, the difference value between the input image and the original image is smaller at the plus side with respect to the peak position of the solid line, and the difference value between the input image and the original image is larger at the minus side. Therefore, the extremal value at the minus side is smaller than the extremal value at the plus side with respect to the peak position of the center of the correction component illustrated in FIG. 3B.

As can be seen from the comparison between the curves illustrated in FIG. 3A and FIG. 3B, the correction amount at the plus side is smaller and the correction amount at the minus side is larger. Therefore, even if sharpening using formula (1) is performed, asymmetric blurring cannot be corrected. FIG. 3C illustrates a result of sharpening performed when the adjustment factor m is set to "1", in which, while sharpening has been attained with respect to the solid line illustrated in FIG. 3A, the minus side is greatly sagging with respect to the plus side, so that it can be seen that asymmetric blurring has not been corrected.

Here, suppose the case of adjusting the correction amount by changing the adjustment factor m in formula (1) without changing the unsharp mask. If the value of the adjustment factor m is made larger so as to sufficiently correct the plus side of the image, the minus side of the image becomes overcorrected (undershot), and, if the value of the adjustment factor m is set in such a way as to make the correction amount at the minus side of the image appropriate, the plus side of the image becomes undercorrected.

In this way, even if unsharp mask processing is performed on an asymmetrically blurred image with use of a rotationally symmetric unsharp mask, it is difficult to sharpen an asymmetrically deteriorated input image. Such a problem also arises even when a rotationally symmetric filter other than a Gaussian filter is used as a rotationally symmetric unsharp mask.

On the other hand, in FIG. 4A, the difference value between the input image and the original image is larger at the plus side with respect to the peak position of the solid line, and the difference value between the input image and the original image is smaller at the minus side. Thus, the tendency opposite to that illustrated in FIG. 3A appears. Therefore, the extremal value at the plus side is also smaller than the extremal value at the plus side with respect to the peak position of the center of the correction component illustrated in FIG. 4B.

Applying the correction component illustrated in FIG. 4B to the input image represented by the solid line illustrated in FIG. 4A enables making the correction amount larger at the plus side (the side at which blurring is larger) with respect to the peak position and making the correction amount smaller at the minus side (the side at which blurring is smaller).

In the case of such an asymmetric unsharp mask, since the balance of a blurring manner of the input image and the balance of the correction amount of the correction component match each other in inclination, overcorrection or undercorrection which would become a problem when a rotationally symmetric unsharp mask is applied becomes unlikely to occur. FIG. 4C illustrates a result of sharpening performed when the adjustment factor m is set to "1", in which sharpening has been attained with respect to the solid line illustrated in FIG. 4A and sagging at the minus side, which would occur in FIG. 3C, has been improved.

Additionally, since overcorrection becomes unlikely to occur as compared with the case of a rotationally symmetric unsharp mask, the value of the adjustment factor m in formula (1) can be set to a relatively large value, so that further sharpening can be attained while asymmetricity is reduced.

Moreover, to improve the correction accuracy, a portion which is more greatly blurred by the PSF of the optical system needs to be also greatly blurred by an unsharp mask. Therefore, with regard to a case where the input image f(x, y) is an image blurred in a rotationally asymmetric manner with respect to the original image I(x, y), it is also favorable that PSFs of the optical system are used as an unsharp mask. In this case, a sharpening filter to be used is a two-dimensional filter having components distributed in a rotationally asymmetric manner. Furthermore, the sharpening filter is a coefficient matrix used to perform convolution computation on the input image in sharpening processing, and components of the sharpening filter are components of the coefficient matrix (tap values).

Furthermore, the PSFs of the optical system vary with each image capturing condition, which includes the focal length of the optical system, the F-number of the optical system, and the subject distance (image capturing distance). Moreover, the PSF also varies depending on positions in the input image. Therefore, it is favorable to vary the sharpening filter for each image capturing condition with respect to each position in the input image.

Next, amplification of noise components included in the input image is described.

Usually, an image generated by image capturing using the optical system contains not only components deteriorated by the PSFs of the optical system but also components deteriorated by noises.

Since sharpening processing is processing for bringing the modulation transfer function (MTF), which is an amplitude component of the optical transfer function of the optical system, close to "1", in a case where a noise component is included in the input image, the noise component may also be amplified. In other words, if the above-mentioned sharpening processing is performed on the input image, not only the input image is sharpened but also a noise component included in the input image may become easily noticeable.

This can be explained as follows with use of formulae (1) and (3).

According to formulae (1) and (3), an image g(x, y) obtained after sharpening processing can be expressed by the following formula.

$$g(x,y)=f(x,y)+m\times f(x,y)*\{\delta(x,y)-USM(x,y)\} \quad (5)$$

When the right-hand side of formula (5) is arranged with regard to the input image f(x, y), the following formula (6) is obtained.

$$g(x,y)=f(x,y)*\{\delta(x,y)+m\times(\delta(x,y)-USM(x,y))\} \quad (6)$$

In formula (6), the term in braces in the right-hand side is equivalent to the sharpening filter. When Fourie transform is performed on formula (6), the following formula (7) can be obtained.

$$G(u,v)=F(u,v)\times\{1+m\times(1-U(u,v))\} \quad (7)$$

In formula (7), G(u, v) is Fourie transform of g(x, y), F(u, v) is Fourie transform of f(x, y), and U(u, v) is Fourie transform of USM(x, y).

FIG. 5 illustrates absolute values in the braces { } in formula (7). In FIG. 5, the horizontal axis indicates spatial frequency and the vertical axis indicates gain. When the real part of Fourie transform U(u, v) of the unsharp mask USM(x, y) is denoted by Re(U(u, v)) and the imaginary part thereof is denoted by Im(U(u, v)), a gain Ga in unsharp mask processing is expressed by the following formula (8).

$$Ga(u,v)=\sqrt{(1+m-mRe(U(u,v)))^2+m^2Im(U(u,v))^2} \quad (8)$$

Assuming that the unsharp mask USM(x, y) is a rotationally symmetric gaussian distribution, the function U(u, v) also becomes a Gaussian distribution. Therefore, the imaginary part Im(U(u, v)) becomes "0", the real part Re(U(u, v)) becomes "0≤Re(U(u, v))≤1", and the gain Ga becomes "1≤Ga≤(1+m)". Moreover, since the Gaussian distribution becomes asymptotic to zero as moving away from the center of the distribution, the real part Re(U(u, v)) also comes close to zero. Therefore, the gain Ga becomes asymptotic to "(1+m)" at frequencies closer to the high-frequency side, so that such a curve as illustrated in FIG. 5 is obtained. Furthermore, FIG. 5 illustrates a case where the adjustment factor m is "1" and the gain Ga is asymptotic to "2" at the high-frequency side.

In a case where the PSFs of the optical system are used as the unsharp mask USM(x, y), the Fourier transform U(u, v) of the unsharp mask USM(x, y) becomes the optical transfer function (OTF), which is Fourier transform of the PSF. The absolute value of the OTF is an amplitude component MTF.

FIG. 6 is a diagram illustrating a change in the amplitude component MTF before and after sharpening by unsharp mask processing. In FIG. 6, a solid line represents the amplitude component MTF obtained before sharpening processing, and a dashed line represents the amplitude component MTF obtained after sharpening processing.

FIG. 6 illustrates a frequency characteristic of the amplitude component subjected to image deterioration due to, for example, aberration. As illustrated in FIG. 6, the amplitude component MTF is higher at the low-frequency side and lower at the high-frequency side. When the amplitude component MTF comes close to zero, the real part and imaginary part of the OTF come close to zero, and, when the frequency at which resolution is possible by the optical system is exceeded, the real part and imaginary part of the OTF become zero. At this time, since the gain Ga(u, v) becomes "(1+m)" according to formula (8), even in a case where the PSFs of the optical system are used as the unsharp mask USM(x, y), the gain Ga becomes a curve increasing at the high-frequency side, as indicated by a dotted line or dashed line in FIG. 5. The gain Ga is constant in every direction (cross-section) if the PSF is rotationally symmetric, and the gain Ga varies with directions if the PSF is rotationally asymmetric. Accordingly, at off-axis positions in which the PSF becomes rotationally asymmetric, the gain Ga also becomes rotationally asymmetric. Moreover, since the real part and imaginary part of the OTF may become minus, the gain Ga may become "Ga>(1+m)" at a predetermined frequency.

As described above, even in a case where a rotationally symmetric filter such as a Gaussian distribution is used as the unsharp mask USM(x, y) or in a case where the PSFs of the optical system are used, the gain Ga becomes a curve increasing as the frequency goes from the low-frequency side to the high-frequency side.

Comparing the amplitude component MTFs obtained before and after sharpening processing with each other, the difference thereof becomes maximum at a frequency fr. This is because the amplitude component MTF obtained before sharpening processing indicated by the solid line in FIG. 6 is multiplied by the gain Ga illustrated in FIG. 5, thus becoming the amplitude component MTF obtained after sharpening processing. In a case where the amplitude component MTF obtained before sharpening processing is low, even if the gain Ga is large, a change in the amplitude component MTF caused by sharpening becomes small.

Here, suppose a case where a noise component is included in the input image. When a noise component included in the input image is denoted by n(x, y), formula (6) can be expressed as the following formula (9).

$$g(x,y)=(f(x,y)+n(x,y))*\{\delta(x,y)+m\times(\delta(x,y)-USM(x,y))\} \quad (9)$$

Similarly, when the Fourier transform of n(x, y) is denoted by N(u, v), formula (7) can be expressed as the following formula (10).

$$G(u,v)=(F(u,v)+N(u,v))\times\{1+m\times(1-U(u,v))\} \quad (10)$$

When unsharp mask processing is performed on the input image including a noise component according to formula (10), both the Fourier transform F(u, v) of f(x, y) which is a component other than noises in the input image and the noise component N(u, v) are multiplied by a portion in the braces { }. Moreover, F(u, v) is acquired by performing Fourier transform on formula (4), and is, therefore, a product of the Fourier transform of the original image I(x, y) and the OTF of the optical system. Since, at the high-frequency side, in which the amplitude component MTF comes close to zero, the real part and imaginary part of the OTF come close to zero as mentioned above, the Fourier transform F(u, v) of the input image f(x, y) also similarly comes close to zero as indicated by the solid line in FIG. 6. On the other hand, considering a noise component such as white noise as the noise component N(u, v), the noise component has a uniform distribution without depending on frequencies. Accordingly, since, at the high-frequency side, the proportion of N(u, v) to F(u, v) becomes larger, if a larger gain is applied to the input image including a noise component at the high-frequency side, the noise component would be amplified rather than the sharpening effect.

Therefore, to appropriately correct the input image, it is necessary to estimate a gain in sharpening processing and adjust the degree of sharpening in sharpening processing based on the gain and a noise characteristic of the input image.

While the gain of the sharpening filter can be obtained with use of formula (8), it becomes necessary to perform two-dimensional Fourier transform on a real-space sharpening filter. Therefore, in a case where the gain is calculated with use of formula (8), the amount of calculation becomes large, so that a processing load required for sharpening processing would increase.

On the other hand, in a case where previously calculated gains are stored, although the amount of calculation required for obtaining gains can be reduced, it is necessary to allocate a storage capacity for storing gains. While, to appropriately correct the input image, it is necessary to vary a sharpening filter for each image capturing condition, if gains are to be stored with respect to respective sharpening filters which are different for the respective image capturing conditions, it becomes necessary to allocate a huge storage capacity for storing the gains.

Therefore, as described below, the present exemplary embodiment is configured to estimate a gain from a real-space sharpening filter and adjust the degree of sharpening in sharpening processing based on the gain and a noise characteristic of the input image. With this, the amplification of noise caused by sharpening can be prevented or reduced while a processing load required for sharpening processing is reduced.

The sharpening processing which is performed by the image processing section in the present exemplary embodiment has been described above.

Next, a configuration of the imaging apparatus in the present exemplary embodiment is described.

Figure 7:
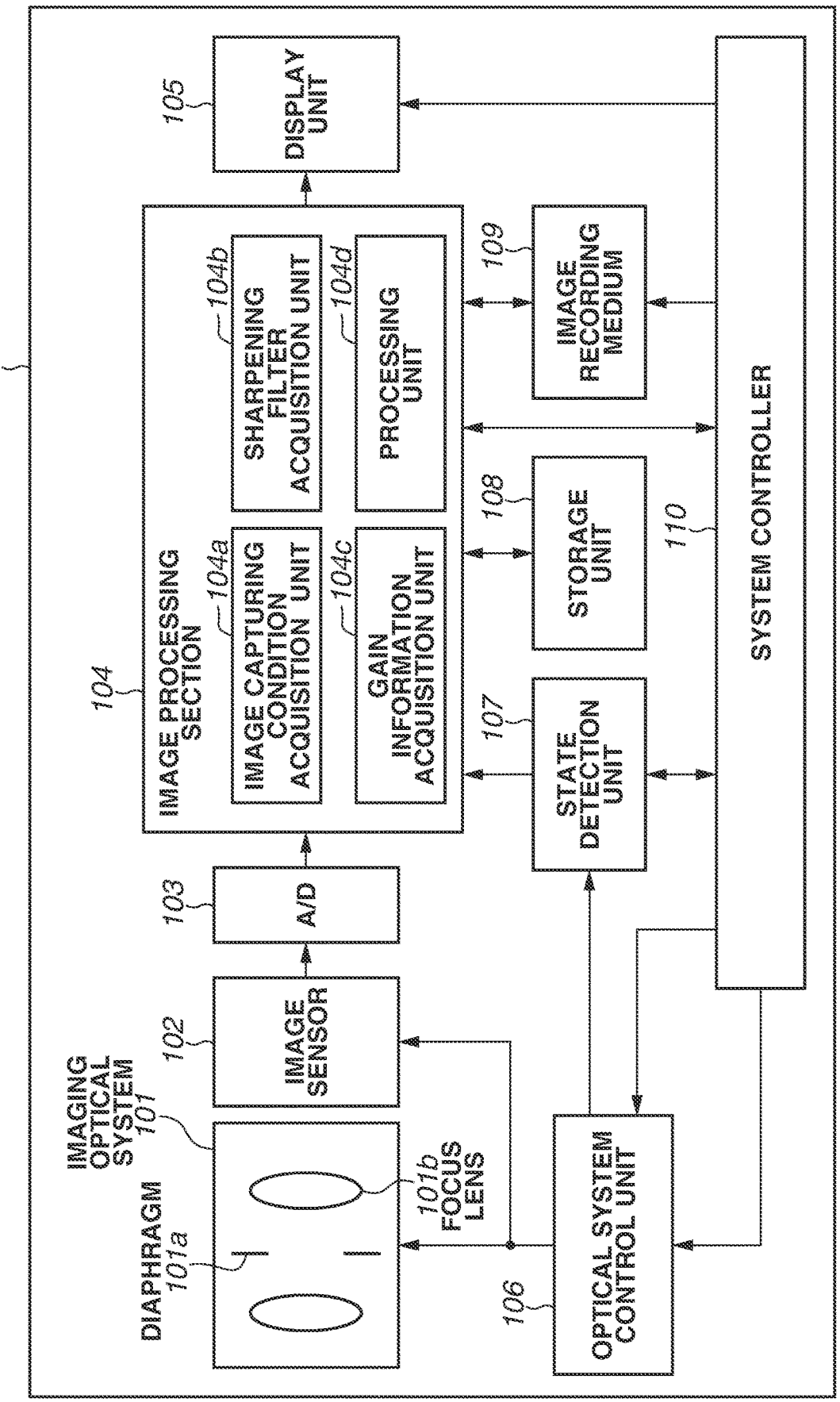
FIG. 7 is a block diagram of an imaging apparatus.
Figure 12:
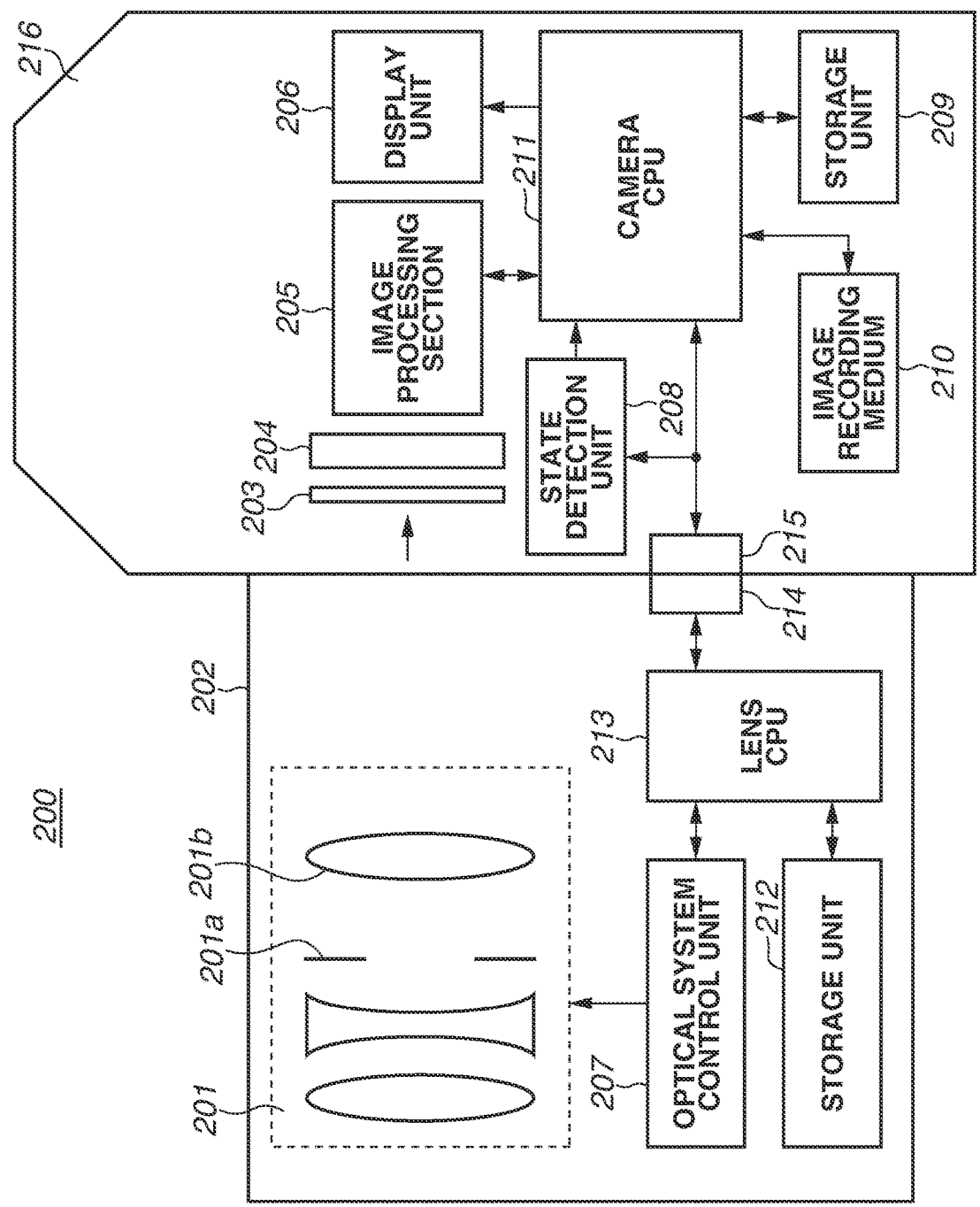
FIG. 12 is an outline diagram of a camera system.

An imaging apparatus 100 in the present exemplary embodiment is described with reference to FIG. 7. FIG. 7 is a block diagram illustrating a configuration of the imaging apparatus 100. An image processing program for performing sharpening processing in the present exemplary embodiment is installed on the imaging apparatus 100, and the sharpening processing is performed by an image processing section (image processing apparatus) 104 included in the imaging apparatus 100. Furthermore, the imaging apparatus 100 illustrated in FIG. 7 is an imaging apparatus according to an exemplary embodiment of the present disclosure. The imaging apparatus according to an exemplary embodiment of the present disclosure can also be configured to have such a configuration as illustrated in FIG. 12 described below.

The imaging apparatus 100 includes an optical system 101 and an imaging apparatus body (camera body).

The optical system 101 includes a diaphragm 101a and a focus lens 101b, and is configured integrally with the camera body. However, the present disclosure is not limited to this, but can also be applied to an imaging apparatus in which the optical system 101 is detachably attached to the camera body. Moreover, the optical system 101 can also be configured to include not only an optical element having a refractive surface, such as a lens, but also an optical element having a diffraction surface or an optical element having a reflecting surface.

An image sensor 102, which is configured with a charge-coupled device (CCD) sensor or a complementary metal-oxide semiconductor (CMOS) sensor, photoelectrically converts a subject image obtained by the optical system 101 (an optical image formed by the optical system 101) to generate a captured image. In other words, the subject image is converted into an analog signal (electrical signal) by photoelectric conversion performed by the image sensor 102. Then, the analog signal is converted into a digital signal by an analog-to-digital (A/D) converter 103. The digital signal is input to the image processing section 104.

The image processing section 104 performs predetermined processing on the digital signal and also performs sharpening processing in the present exemplary embodiment. As illustrated in FIG. 7, the image processing section 104 includes an image capturing condition acquisition unit (first acquisition unit) 104a, a sharpening filter acquisition unit (second acquisition unit) 104b, a gain information acquisition unit (third acquisition unit) 104c, and a processing unit 104d. The image capturing condition acquisition unit 104a acquires an image capturing condition of the imaging apparatus 100 from a state detection unit 107. The image capturing condition includes an aperture value of the optical system 101, an image capturing distance, and a focal length. The state detection unit 107 can directly acquire the image capturing condition from a system controller 110 or can acquire the image capturing condition from an optical system control unit 106.

The PSF or data required for generating the PSF is stored in a storage unit 108. The storage unit 108 is configured with, for example, a read-only memory (ROM). An output image processed by the image processing section 104 is stored in a predetermined format in an image recording medium 109. An image obtained by performing predetermined display processing on an image subjected to sharpening processing is displayed on a display unit 105, which is configured with a liquid crustal monitor or an organic electroluminescence (EL) display. However, an image to be displayed on the display unit 105 is not limited to this, but an image subjected to simple processing for fast display can be displayed on the display unit 105.

The system controller 110 performs control on the imaging apparatus 100. Mechanical driving of the optical system 101 is performed by the optical system control unit 106 based on an instruction from the system controller 110. The optical system control unit 106 controls the aperture diameter of the diaphragm 101a in such a way as to attain a predetermined F-number. Moreover, the optical system control unit 106 controls the position of the focus lens 101b via an auto-focus (AF) mechanism or a manual focus mechanism (not illustrated) so as to perform focus adjustment according to the subject distance. Furthermore, depending on the specifications of the imaging apparatus 100, functions such as the aperture diameter control of the diaphragm 101a and manual focus do not need to be performed.

Furthermore, while an optical element such as a low-pass filter or an infrared cut filter can be located between the optical system 101 and the image sensor 102, in a case where an element which affects an optical characteristic, such as a low-pass filter, is used, consideration at the time of generating a sharpening filter may become required. Even with regard to an infrared cut filter, which affects PSFs of RGB channels, which are integrated values of PSFs of spectral wavelengths, particularly, the PSF of the R channel, consideration at the time of generating a sharpening filter may also become required. Accordingly, a sharpening filter can be changed according to the presence or absence of a low-pass filter or an infrared cut filter.

Furthermore, the image processing section 104 is configured with an application specific integrated circuit (ASIC), and each of the optical system control unit 106, the state detection unit 107, and the system controller 110 is configured with a central processing unit (CPU) or a micro processing unit (MPU). Moreover, at least one of the image processing section 104, the optical system control unit 106, the state detection unit 107, and the system controller 110 can be configured with the same CPU or MPU.

Next, examples of sharpening processing which is performed by the image processing section 104 are described.

Example 1

Figure 8:
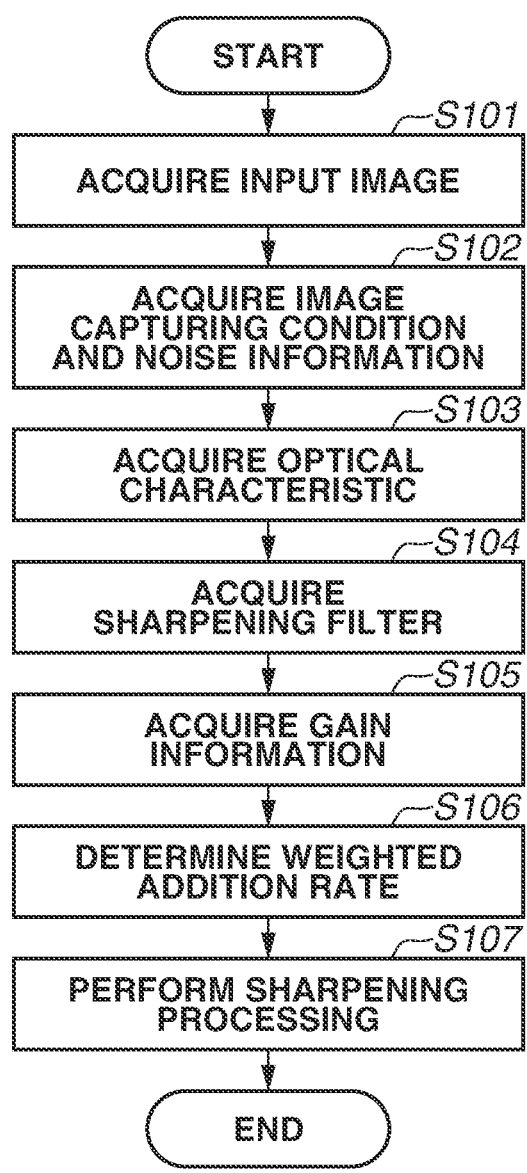
FIG. 8 is a flowchart of image processing in Example 1.

FIG. 8 is a flowchart of sharpening processing in Example 1. The flowchart of FIG. 8 is performed based on an instruction from the image processing section 104. Moreover, the flowchart of FIG. 8 can also be implemented as a program for causing a computer to perform each step to fulfill functions similar to those of the image processing section 104. These also apply to a flowchart illustrated in FIG. 11.

In step S101, the image processing section 104 acquires an image captured by the imaging apparatus 100 as an input image. The input image is then stored in the storage unit 108. Moreover, the image processing section 104 can acquire, as an input image, an image which is previously stored in the image recording medium 109.

In step S102, the image capturing condition acquisition unit 104a acquires an image capturing condition used at the time of image capturing of the input image. The image capturing condition is, for example, the focal length of the optical system 101, an aperture value, and an image capturing distance. In the case of an imaging apparatus in which the optical system 101 is attached to the camera body in an interchangeable manner, the image capturing condition further includes a lens identifier (ID) and a camera ID. The image capturing condition can be directly acquired from the imaging apparatus or can be acquired from information appended to the input image (for example, Exif information).

Moreover, in step S102, the image capturing condition acquisition unit 104a also acquires noise information about a noise characteristic of the input image. The noise information only needs to be information which is associated with the magnitude of noise included in the input image. The noise information includes, for example, the sensitivity and temperature of the image sensor 102. Moreover, in a case where image processing has been performed on the input image prior to sharpening processing, the image processing may affect a noise characteristic of the input image. Accordingly, the noise information can include information about image processing which has been performed on the input image prior to sharpening processing. Furthermore, since, in an ordinary imaging apparatus, not only the above-mentioned image capturing condition but also the ISO sensitivity, which serves as the sensitivity of the image sensor, is recorded together with the captured image, it is favorable that the ISO sensitivity is used as the noise information. In the following description, an example in which the ISO sensitivity is used as the noise information is described.

In step S103, the sharpening filter acquisition unit 104b acquires an optical characteristic of the optical system 101 from the storage unit 108. Here, the sharpening filter acquisition unit 104b acquires a PSF as the optical characteristic. However, the sharpening filter acquisition unit 104b can acquire, as the optical characteristic, for example, a characteristic equivalent to the PSF, such as an OTF, or coefficient data about a function which approximately represents a PSF or OTF.

In step S104, the sharpening filter acquisition unit 104b acquires a sharpening filter corresponding to the image capturing condition acquired in step S102 based on the optical characteristic acquired in step S103. In the present example, the sharpening filter acquisition unit 104b acquires a sharpening filter in which the PSF acquired in step S103 is used for USM(x, y) in the sharpening filter defined in formula (6).

Furthermore, in a case where no PSF corresponding to the image capturing condition acquired in step S102 is stored, the sharpening filter acquisition unit 104b can acquire a sharpening filter that is based on a PSF corresponding to an image capturing condition closest to the image capturing condition acquired in step S102 among PSFs stored in the storage unit 108. Moreover, the sharpening filter acquisition unit 104b can acquire a sharpening filter that is based on a PSF obtained by performing interpolation on a PSF corresponding to an image capturing condition close to the image capturing condition acquired in step S102, or can acquire a sharpening filter obtained by performing interpolation on a sharpening filter that is based on a PSF corresponding to an image capturing condition close to the image capturing condition acquired in step S102.

Moreover, while, in the present example, a sharpening filter is acquired based on the optical characteristic, the present disclosure is not limited to this. A sharpening filter generated based on the optical characteristic of the optical system 101 can be previously stored in the storage unit 108, and the sharpening filter acquisition unit 104b can directly acquire the sharpening filter from the storage unit 108. In this case, step S103 is skipped.

Furthermore, in step S104, the sharpening filter acquisition unit 104b acquires a plurality of sharpening filters respectively applicable with respect to a plurality of positions of the input image. Since optical characteristics (PSFs) in the respective positions of the input image are different from each other, the sharpening filters applicable with respect to the respective positions of the input image are different from each other.

Moreover, the sharpening filter which is acquired in step S104 is a filter not in a frequency space but in a real space. While, in the case of acquiring a filter in a frequency space as the sharpening filter, it becomes necessary to perform inverse Fourier transform in sharpening the input image, acquiring a filter in a real space enables directly applying the filter to an image. Therefore, a processing load required for sharpening processing can be reduced. This enables increasing computation speed of sharpening processing. Moreover, since a processing load required for sharpening processing is reduced, sharpening processing can be implemented with a relatively inexpensive chip. This enables attaining a reduction in product cost.

In step S105, the gain information acquisition unit 104c acquires gain information about the sharpening filter acquired in step S104. The gain information is information about the gain of the sharpening filter or data that is able to be treated as equivalent to the gain. The gain information can be information about a gain in a specific frequency of the sharpening filter, or can be information about a value obtained by averaging gains of the sharpening filter with respect to frequencies.

As mentioned above, in the present example, gain information is acquired from components of the sharpening filter in a real space. The method for acquiring the gain information from the sharpening filter in a real space includes a method of using Parseval's identity.

When the sharpening filter in a real space is denoted by k(x, y), Fourier transform of k(x, y) is denoted by K(fx, fy), the number of taps in the x-direction of k(x, y) is denoted by Nx, and the number of taps in the y-direction thereof is denoted by Ny, the following Parseval's identity holds.

$$\frac{1}{N_x N_y} \sum_{f_x, f_y} |K(f_x, f_y)|^2 = \sum_{x,y} |k(x, y)|^2 \qquad (11)$$

In other words, calculating a square sum of components of the sharpening filter in a real space enables calculating the average of square sums with respect to frequency components of the gain without performing Fourier transform. Thus, the average value with respect to frequencies of the gain of the sharpening filter can be calculated.

Moreover, other methods for acquiring gain information from components of the sharpening filter in a real space include a method of calculating the sum of products of the components of the sharpening filter in a real space and a specific frequency component as expressed in the following formula (12). In this case, only the value of the gain in a specific frequency of the sharpening filter can be calculated.

$$|K(f_x, f_y)| = \left| \sum_{x=0}^{N_x-1} \sum_{y=0}^{N_y-1} k(x, y) \exp\left[-i\left(\frac{2\pi f_x x}{N_x}\right)\right] \cdot \exp\left[-i\left(\frac{2\pi f_y y}{N_y}\right)\right] \right| \quad (12)$$

The gain which is able to be acquired in formula (12) is a gain concerning a specific frequency in the gain characteristic illustrated in FIG. 5. Calculating only the gain concerning a specific frequency enables acquiring gain information while more reducing a processing load than performing two-dimensional Fourier transform. The value of a portion of "exp" in formula (12) equivalent to the specific frequency only needs to be previously stored in the storage unit 108.

This enables acquiring information about the gain on a frequency space without performing two-dimensional Fourier transform. Furthermore, the gain can be acquired by a calculation using another formula according to which a result equivalent to that obtained in formula (11) or formula (12) can be obtained.

Furthermore, when, as gain information in an image capturing condition of the input image, a value in an image capturing condition different from the image capturing condition of the input image is used or interpolation is performed from a value in an image capturing condition different from the image capturing condition of the input image, there may be a case where gain information with a sufficient degree of accuracy cannot be obtained. On the other hand, in the present example, since gain information is directly acquired from the sharpening filter, it is not necessary to perform interpolation on the gain information with respect to an image capturing condition. Accordingly, gain information can be acquired with a high degree of accuracy.

While, in the present example, the gain information acquisition unit 104c acquires gain information about each sharpening filter acquired in step S104 based on components of each sharpening filter, the present disclosure is not limited to this. Thus, it is not necessary to acquire gain information from components of each sharpening filter with respect to all of the sharpening filters which are applied to the respective image plane positions of the input image. For example, gain information (first gain information) acquired with use of components of a sharpening filter (first sharpening filter) concerning a specific position (first position) can be used to perform sharpening processing concerning another position (second position).

Specifically, only with respect to a sharpening filter which is applied to a part of image plane positions of the input image, gain information can be acquired based on components of the sharpening filter, and gain information in the other image plane positions can be acquired by performing interpolation from gain information in the surrounding image plane positions. This enables reducing a processing load in acquiring gain information. In this case, since, while interpolation on image plane positions in the input image is performed, interpolation on an image capturing condition is not performed, gain information with a sufficient degree of accuracy can be acquired while a processing load is reduced.

In step S106, the image processing section 104 determines a weighted addition rate (the proportion of the input image to the output image) in sharpening processing based on the noise information acquired in step S102 and the gain information acquired in step S105. An example of the method for determining the weighted addition rate is described with reference to FIG. 9.

Figure 9:
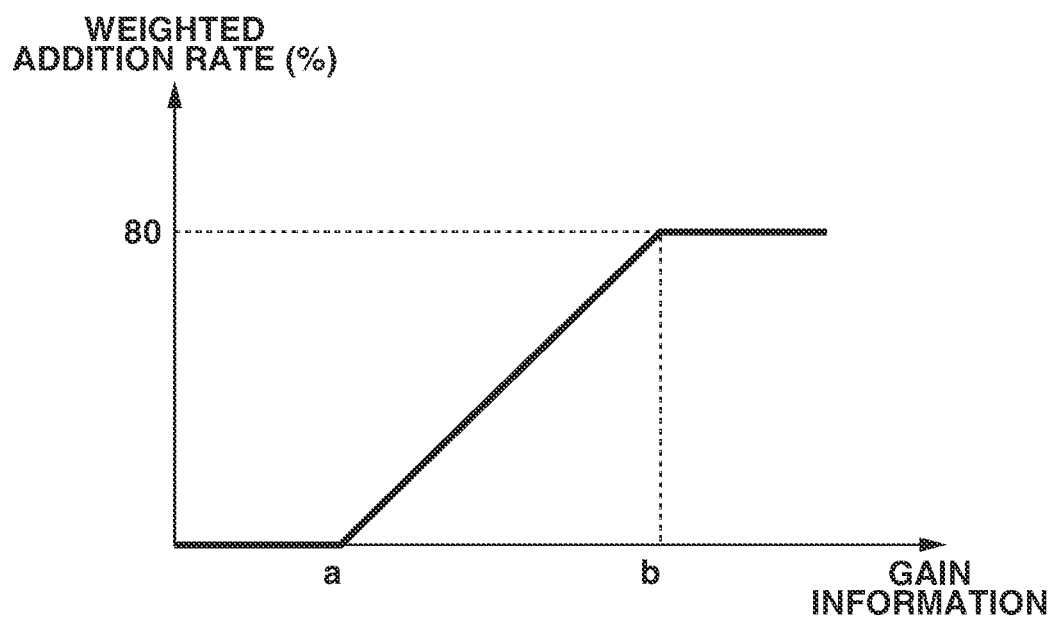
FIG. 9 is a diagram illustrating the relationship between gain information and weighted addition rate.

FIG. 9 is a diagram illustrating a weighted addition rate with respect to gain information in a predetermined ISO sensitivity. In FIG. 9, in a case where the gain information is smaller than "a", the weighted addition rate is set to 0%. In other words, in a case where the gain information is smaller than "a", an image obtained by performing correction using a sharpening filter (g(x, y) in formula (6)) directly serves as the output image.

Moreover, in FIG. 9, in a case where the gain information is larger than "b", the weighted addition rate is set to 80%. In other words, an image obtained by performing weighted averaging with 80% of the input image and 20% of the corrected image serves as the output image. This is equivalent to adding 20% of a difference between a post-correction image and a pre-correction image to the pre-correction image, and such a calculation can be employed. Thus, the value of the adjustment factor m in formula (6) can be adjusted.

In this way, determining the weighted addition rate based on the gain information and the noise information to perform sharpening processing enables increasing signals of a pre-correction input image in a case where the gain becomes large. In other words, in a case where the influence of noise amplification is considered to be large, based on the gain information and the noise information, the degree of sharpening by sharpening processing can be weakened. As a result, the amplification of noise caused by sharpening processing can be reduced with simple processing.

Furthermore, a relationship between the gain information and the weighted addition rate such as that illustrated in FIG. 9 can be stored in the storage unit 108 in association with the noise information. For example, in a case where the noise information is ISO sensitivity, the relationship between the gain information and the weighted addition rate can be stored as table data for each value that can be taken as the ISO sensitivity. Moreover, the value of "a" in the value of a typical ISO sensitivity and the inclination between "a" and "b" can be previously stored and a relationship between the gain information and the weighted addition rate in an ISO sensitivity that is not stored can be calculated from the stored relationship.

In step S107, the image processing section 104 performs sharpening processing of the input image using the sharpening filter acquired in step S104. Thus, the image processing section 104 sharpens the input image by convoluting the sharpening filter into the input image.

Furthermore, while, in the present example, the weighted addition rate (or the adjustment factor m) is determined based on the gain information and the noise information to output the output image, the present disclosure is not limited to this. Processing in steps S106 and S107 only needs to be processing for reducing the amplification of noise caused by sharpening processing based on the gain information and the noise information.

Example 2

Next, sharpening processing in Example 2 is described.

In Example 1, gain information about the acquired sharpening filter is acquired and sharpening processing is then performed with use of the same sharpening filter. This enables correctly acquiring gain information about a filter used to perform sharpening processing. On the other hand, in the present example, gain information (first gain information) acquired with use of components of a sharpening filter (first sharpening filter) concerning a specific position (first position) is used to acquire a sharpening filter (second sharpening filter) concerning another position (second position). Then, sharpening processing concerning the second position is performed with use of the second sharpening filter. This enables evaluating gain information more easily and also enables further reducing a processing load for sharpening processing.

Prior to the description of the method for acquiring gain information in the present example, the acquisition of a sharpening filter in the present example is described with reference to FIGS. 10A and 10B.

Figure 10A:
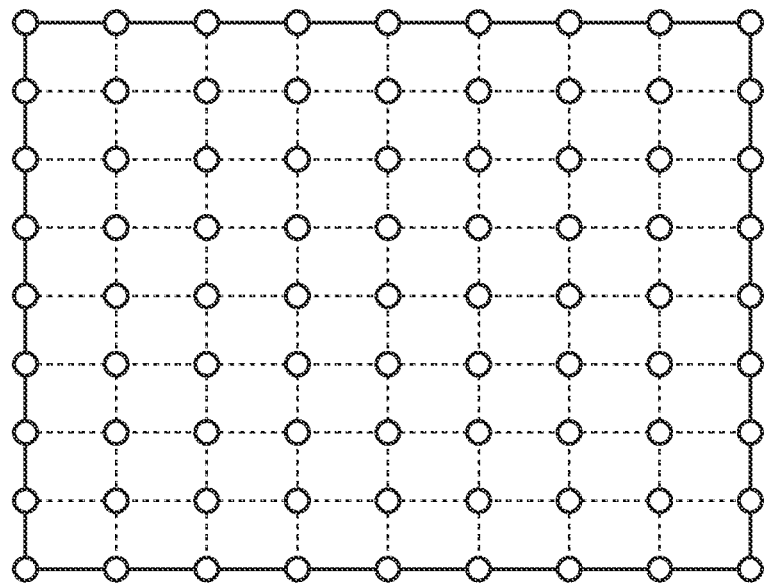
FIGS. 10A and 10B are diagrams used to explain generation of a sharpening filter in Example 2.

FIG. 10A illustrates positions on the input image on each of which a sharpening filter is generated. An unfilled circle in FIG. 10A represents a position on the input image on which a sharpening filter is generated. In the present example, sharpening filters are generated based on the optical characteristic of the optical system 101 with respect to 81 discrete positions on the input image. When, for example, linear interpolation is performed on these generated sharpening filters, sharpening filters in any given positions on the input image can be generated. This enables applying appropriate sharpening filters to any given positions on the input image while reducing a processing load for generating sharpening filters.

Furthermore, while, in FIG. 10A, 9×9=81 positions are set as the positions on which sharpening filters are generated, to more reduce the processing load, the positions can be decreased, or, to more increase the correction accuracy, the positions can be increased.

Moreover, while optical characteristics can be directly acquired and sharpening filters can be generated with respect to the respective points of unfilled circles illustrated in FIG. 10A, these optical characteristics and sharpening filters can be generated with interpolation. FIG. 10B illustrates an example of that generation and illustrates a case where optical characteristics in the respective positions are generated with interpolation.

Figure 10B:
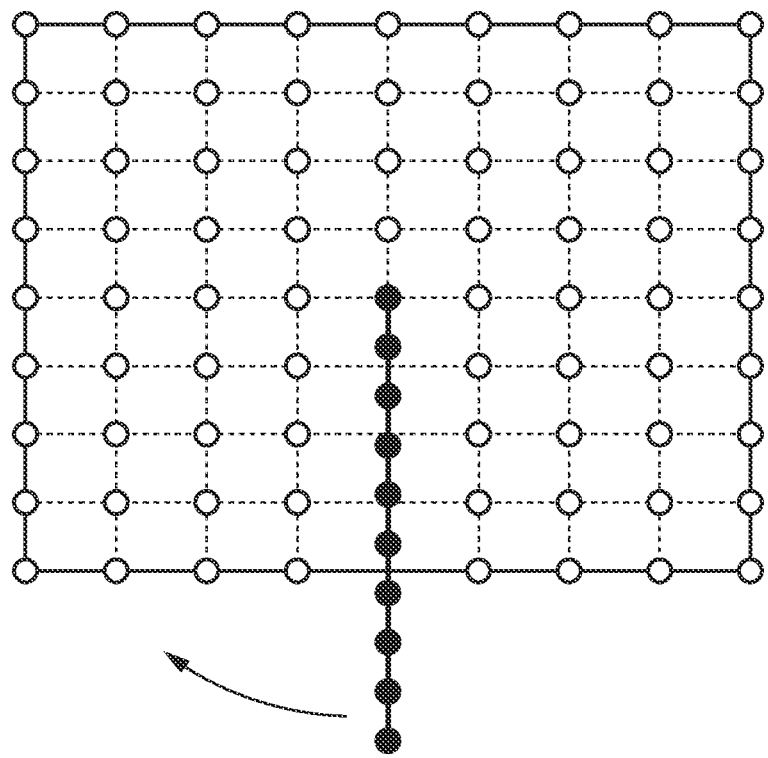

First, optical characteristics in positions of filled circles illustrated in FIG. 10B are acquired. In general, since the PSFs of an optical system are rotationally symmetric with respect to the optical axis, the optical characteristics thereof are also similarly rotationally symmetric with respect to the optical axis. With the use of such features, in FIG. 10B, optical characteristics in a plurality of positions (10 positions indicated by filled circles) different in image height (distance from the center of the input image) are acquired and the acquired optical characteristics are rotated around the center of the input image to generate optical characteristics corresponding to respective unfilled circles with interpolation. Then, sharpening filters in the respective positions are acquired based on the optical characteristics in the respective positions. This eliminates the necessity of acquiring optical characteristics with respect to respective positions indicated by unfilled circles, and, therefore, enables reducing a processing load or data amount.

Furthermore, while, here, optical characteristics in 81 points are acquired from optical characteristics in 10 positions with interpolation, sharpening filters can be first acquired from optical characteristics in 10 points and interpolation can be performed on the acquired sharpening filters to acquire sharpening filters in 81 points.

Next, the method of acquiring gain information in the present example is described. In FIG. 10B, to accurately acquire gain information with respect to each position, it is necessary to calculate gain information based on a sharpening filter in each position. On the other hand, if sharpening filters corresponding to optical characteristics in the filled circles illustrated in FIG. 10B are acquired and gain information is calculated from the acquired sharpening filters, gain information in each image height can be acquired. Thus, a change in gain information with respect to image heights can be acquired.

With the use of gain information in pieces of information calculated in the above-mentioned way, gain information about a sharpening filter which is generated in a position corresponding to each unfilled circle illustrated in FIG. 10B can be estimated. In the present example, a gain of each sharpening filter which is generated in a position corresponding to each unfilled circle illustrated in FIG. 10B is adjusted with use of gain information in each image height, so that sharpening processing can be performed with an appropriate degree in each position on the input image. This prevents or reduces the amplification of noise caused by sharpening while reducing a processing load.

Thus, while, in Example 1, gain information is calculated with respect to each generated sharpening filter, the present example differs from Example 1 in that gain information concerning each image height is acquired and a sharpening filter in each position on the input image is acquired with use of the gain information in each image height.

In a case where gain information is acquired with respect to each sharpening filter generated in a position corresponding to each unfilled circle illustrated in FIG. 10B, it is necessary to calculate gain information in 81 positions based on, for example, formula (11) or formula (12). On the other hand, according to the present example, gain information only needs to be calculated based on, for example, formula (11) or formula (12) with respect to 10 positions indicated by filled circles illustrated in FIG. 10B, so that a processing load for calculating gain information can be further reduced.

Figure 11:
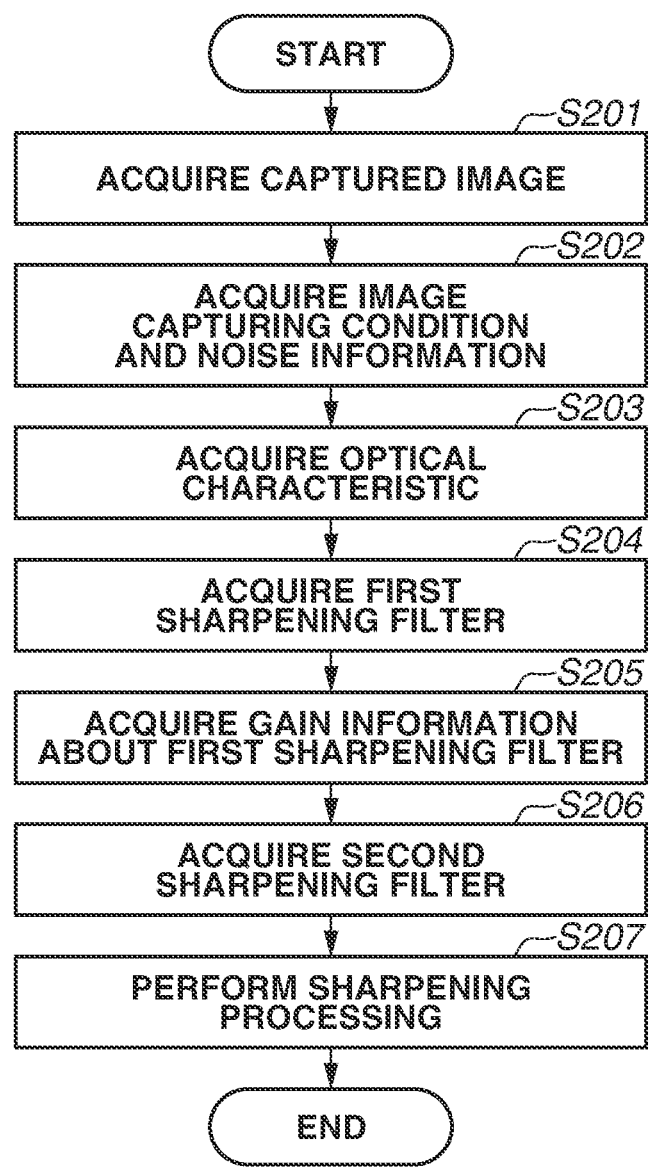
FIG. 11 is a flowchart of image processing in Example 2.

FIG. 11 is a flowchart of sharpening processing in Example 2. The flowchart of FIG. 11 is performed based on an instruction from the image processing section 104.

Steps S201 to S203 are similar to steps S101 to S103 and are, therefore, omitted from description.

In step S204, the sharpening filter acquisition unit 104b acquires a sharpening filter (first sharpening filter) in a position indicated by each filled circle illustrated in FIG. 10B based on the optical characteristic (PSF) in a position indicated by each filled circle.

In step S205, the gain information acquisition unit 104c acquires gain information in each image height by acquiring gain information from each first sharpening filter, in a way similar to that in Example 1.

In step S206, the sharpening filter acquisition unit 104b acquires a sharpening filter (second sharpening filter) in a position indicated by each unfilled circle illustrated in FIG. 10B based on the gain information in each image height, the PSF in a position indicated by each filled circle in FIG. 10B, and the noise information. At this time, the sharpening filter acquisition unit 104b generates the second sharpening filter in such a manner that the gain of the second sharpening filter becomes a desired value, based on the gain information in each image height and the noise information. Specifically, the gain of each second sharpening filter is adjusted by adjusting the adjustment factor m in formula (6).

Furthermore, in the second sharpening filter which is acquired in step S206, the gain thereof only needs to be adjusted based on gain information in each image height and noise information. Therefore, the second sharpening filter can be acquired in various methods. For example, a PSF in an unfilled circle can be acquired from a PSF in a position indicated by a filled circle and the second sharpening filter can be generated based on the PSF in a position indicated by an unfilled circle and the gain information in each image height and the noise information. In this case, the adjustment factor m is determined with respect to each of second sharpening filters which are generated with respect to the respective positions of unfilled circles.

Moreover, the adjustment factor m is determined with respect to each position indicated by a filled circle based on the PSF in a position indicated by a filled circle and the gain information in each image height and the noise information, and a sharpening filter the gain of which has been adjusted with respect to each position indicated by a filled circle is generated. A second sharpening filter in a position of each unfilled circle can be generated by rotating the sharpening filter the gain of which has been adjusted around the center of the input image and performing implementation thereon. In this case, the adjustment factor m only needs to be determined with respect to each position indicated by a filled circle.

Moreover, the adjustment factor m is determined with respect to each position indicated by a filled circle based on the PSF in each position indicated by a filled circle and the gain information in each image height and the noise information. The adjustment factor m in each image height and the PSF in each position indicated by a filled circle, which are determined in the above-mentioned way, are used to acquire a product of the adjustment factor m and the PSF (equivalent to USM(x, y) in formula (6)) in a position indicated by each filled circle. The adjustment factor m and the PSF in a position of each unfilled circle is acquired by rotating a product of the adjustment factor m and the PSF in a position indicated by each filled circle and performing interpolation thereon. A second sharpening filter can be generated with use of a product of the adjustment factor m and the PSF acquired in the above-mentioned way. In this case, the adjustment factor m also only needs to be determined with respect to a position of each filled circle. In step S207, the processing unit 104d performs sharpening processing. The sharpening processing in step S207 is performed by convoluting the second sharpening filter acquired in step S206 into the input image.

According to the above processing, gain information with a sufficient degree of accuracy can be acquired by simpler processing as compared with Example 1. This enables preventing or reducing the amplification of noise caused by sharpening while reducing a processing load.

Furthermore, while, in each of the above examples, performing unsharp mask processing using the PSF as sharpening processing has been described, the present disclosure is not limited to this. Sharpening processing in the present exemplary embodiment only needs to be processing using a sharpening filter that is based on an optical characteristic of the optical system 101. For example, the sharpening processing can be unsharp mask processing which does not use a PSF or edge enhancement processing. Moreover, the sharpening processing can be image restoration processing typified by a Wiener filter or iterative processing-type image restoration processing typified by Richardson-Lucy (RL) algorithm.

Furthermore, each processing in the sharpening processing in Examples 1 and 2 does not need to be performed by a single image processing apparatus. For example, a program for implementing a part or the whole of processing in each example can be supplied to a system composed of one or a plurality of apparatuses via a network or a recording medium and the system or apparatus can be caused to execute the program.

Alternatively, as another exemplary embodiment, the image processing method described in the above-described Examples 1 and 2 can be performed by a lens-interchangeable type camera system 200 illustrated in FIG. 12.

The camera system 200 includes a camera body (imaging apparatus body) 216 and an interchangeable lens (lens apparatus) 202, which is detachably attached to the camera body 216. A storage unit 209 is configured with, for example, a ROM (memory) or a hard disk drive. A program for performing the image processing method described in Examples 1 and 2 is installed on the storage unit 209. The program for performing the image processing method described in Examples 1 and 2 is performed by an image processing section (image processing apparatus) 205 of the camera body 216. The configuration of the image processing section 205 is similar to that of the image processing section 104 illustrated in FIG. 7, and is able to perform the image processing in Example 1 or 2. Furthermore, a program for the image processing method in Example 1 or 2 can be installed on a storage unit (not illustrated) provided inside the image processing section 205, instead of the storage unit 209. Moreover, a circuit corresponding to the program can be designed and the image processing can be performed by causing the circuit to operate.

The image processing section 205 not only performs predetermined processing on a digital signal but also performs the sharpening processing described in Example 1 or 2. The image processing section 205 acquires an image capturing condition (image capturing condition information) from a state detection unit 208. The image capturing condition information is information about, for example, an image height, an aperture value (F-value), an image capturing distance, or the focal length of a zoom lens. The state detection unit 208 is able to directly acquire image capturing condition information from a camera CPU 211, but is not limited to this. For example, image capturing condition information about an imaging optical system 201 of the interchangeable lens 202 can be acquired from an optical system control unit 207 via a lens CPU 213.

An output image processed by the image processing section 205 is then stored in the storage unit 209 in a predetermined format.

A display unit 206 is able to display an image obtained by performing predetermined display processing after sharpening processing. An image obtained by performing simple processing for fast display can be displayed on the display unit 206.

Moreover, the camera body 216 includes an optical low-pass filter 203, an image sensor 204, and an image recording medium 210. The image sensor 204 is a two-dimensional image sensor, such as a charge-coupled device (CCD) sensor or a complementary metal-oxide semiconductor (CMOS) sensor. The image sensor 204 photoelectrically converts a subject image (optical image or imaging light) obtained via the imaging optical system 201 and the optical low-pass filter 203 to generate a captured image. The subject image is converted into an analog signal (electrical signal) by photoelectric conversion performed by the image sensor 204. The analog signal is converted into a digital signal by an A/D converter (not illustrated), and the digital signal is input to the image processing section 205.

In a case where an optical element which affects an image forming performance, such as a low-pass filter or an infrared cut filter, taking into consideration the influence of the optical element at the time of generating a sharpening filter enables performing high-precision sharpening processing.

The interchangeable lens 202 includes the imaging optical system 201, the optical system control unit 207, a storage unit 212, the lens CPU 213, and a contact unit 214. The imaging optical system 201 is configured to include a diaphragm 201*a* and a focus lens 201*b*. The lens CPU 213 has the functions of, for example, a communication circuit (communication unit) used for performing communication between the interchangeable lens 202 and the camera body 216, reset exception processing, A/D, a timer, an input-output port, a built-in ROM, and a built-in random access memory (RAM). The communication circuit performs communication in a communication method including control information corresponding to image capturing modes (moving image capturing mode and still image capturing mode) between the interchangeable lens 202 and the camera body 216. The optical system control unit 207 is a lens control unit which controls constituent elements included in the interchangeable lens 202, and performs driving control of optical elements, such as a lens and a diaphragm, with use of control information obtained via the communication circuit based on an instruction from the lens CPU 213. The contact unit 214 includes a plurality of metallic contacts used to perform communication between the interchangeable lens 202 and the camera body 216, and is a connection unit which electrically interconnects the lens CPU 213 and the camera CPU 211.

The storage unit 212 is a rewritable non-volatile memory. Data which is stored in the storage unit 212 includes information indicating a unique optical characteristic.

Information which is stored in the storage unit 212 is specifically described. The storage unit 212 stores pieces of information concerning PSFs, such as coefficient data of a function which is used to reconstruct (approximate) PSFs of the imaging optical system 201 and the adjustment factor m. These pieces of information are transmitted from the interchangeable lens 202 to the camera body 216 via contact units 214 and 215 at predetermined timing. The predetermined timing can be the time of initial communication performed when the interchangeable lens 202 has been attached to the camera body 216 or when the camera body 216 has been activated after attachment of the interchangeable lens 202 or the time when sharpening processing is performed on a captured image by the image processing section 205.

The camera body 216 performs image processing described in Example 1 or 2 based on information concerning PSFs transmitted from the interchangeable lens 202. More specifically, a sharpening filter acquisition unit of the image processing section 205 generates a sharpening filter based on the information concerning PSFs transmitted from the interchangeable lens 202. A gain information acquisition unit and a processing unit of the image processing section 205 perform the above-described processing based on the generated sharpening filter. Furthermore, the camera body 216 can previously store the information concerning PSFs transmitted from the interchangeable lens 202 in the storage unit 209, and can perform image processing described in Example 1 or 2 at required timing. The required timing can be the time when an image has been captured or the time designated by the operation of the user.

In this way, the information concerning PSFs stored in the storage unit 212 is information which is used to generate a sharpening filter, and can be said to be information concerning a sharpening filter (information for generating a sharpening filter).

As described above, in the case of a lens-interchangeable type camera system, it is favorable that information concerning a sharpening filter is previously stored in the interchangeable lens side and the camera body acquires the information concerning a sharpening filter from the interchangeable lens to perform sharpening processing. In the case of a lens-interchangeable type camera system, any of a plurality of interchangeable lenses can be attached to a single camera body. In this way, such a configuration that the camera body acquires information concerning a sharpening filter from the interchangeable lens enables decreasing the capacity of a storage unit of the camera body side. This is because it becomes unnecessary to cause the camera body to previously store information concerning a sharpening filter with respect to a plurality of types of interchangeable lenses.

While exemplary embodiments and examples of the present disclosure have been described above, the present disclosure is not limited to these exemplary embodiments and examples, but various combinations, modifications, and alterations thereof can be performed within the range of the gist thereof.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Applications No. 2017-213823, filed Nov. 6, 2017, and No. 2018-149432, filed Aug. 8, 2018, which are hereby incorporated by reference herein in their entirety.

What is claimed is:

1. An image processing apparatus comprising:
at least one processor configured to execute a plurality of tasks including:
a first acquisition task of acquiring noise information about a noise characteristic of an input image generated by image capturing using an optical system;
a second acquisition task of acquiring a first sharpening filter in a real space, the first sharpening filter being based on an optical characteristic of the optical system; and
a third acquisition task of acquiring gain information about gain of the first sharpening filter using a sum of squares of components of the first sharpening filter, or acquiring gain information about gain of the first sharpening filter in a specific frequency using components of the first sharpening filter,
wherein the third acquisition task does not use the input image to acquire the gain information, and
wherein the image processing apparatus performs sharpening processing to generate an output image by convolving the input image with a second sharpening filter based on the first sharpening filter
wherein the second sharpening filter is generated by adjusting a correction amount for the input image by the first sharpening filter based on the gain information and noise information so that an adjustment amount for the correction amount increases as a gain of the first sharpening filter increases, and
wherein the gain information is information on an absolute value of frequency characteristics of the first sharpening filter.

2. The image processing apparatus according to claim 1, wherein the optical characteristic is an optical characteristic in an image capturing condition used during image capturing of the input image.

3. The image processing apparatus according to claim 1, wherein the optical characteristic is a point spread function of the optical system.

4. The image processing apparatus according to claim 1, wherein the noise information is an International Organization for Standardization (ISO) sensitivity.

5. The image processing apparatus according to claim 1, wherein the sharpening processing is unsharp mask processing.

6. The image processing apparatus according to claim 1,
wherein the first sharpening filter is a two-dimensional filter, and
wherein the components of the first sharpening filter are distributed in a rotationally asymmetric manner.

7. The image processing apparatus according to claim 1, wherein the second acquisition task acquires respective different sharpening filters with respect to a plurality of respective positions in the input image.

8. The image processing apparatus according to claim 7,
wherein the third acquisition task acquires first gain information with use of components of the first sharpening filter concerning a first position with respect to the input image, and
wherein the image processing apparatus performs the sharpening processing concerning a second position different from the first position with use of the first gain information and the noise information.

9. The image processing apparatus according to claim 7,
wherein the third acquisition task acquires gain information in each image height of the input image with use of components of the first sharpening filter concerning each of a plurality of positions different in image height with respect to the input image, and
wherein the image processing apparatus performs the sharpening processing on the input image with use of the gain information in each image height and the noise information.

10. An imaging apparatus comprising:
an image sensor configured to photoelectrically convert an image formed by an optical system; and
at least one processor
configured to execute a plurality of tasks including:
a first acquisition task of acquiring noise information about a noise characteristic of an input image generated by image capturing using the optical system and the image sensor,
a second acquisition task of acquiring a first sharpening filter in a real space, the first sharpening filter being based on an optical characteristic of the optical system, and
a third acquisition task of acquiring gain information about gain of the first sharpening filter using a sum of squares of components of the first sharpening filter, or acquiring gain information about gain of the first sharpening filter in a specific frequency using components of the first sharpening filter,
wherein the third acquisition task does not use the input image to acquire the gain information, and
wherein the image processing section performs sharpening processing to generate an output image by convolving the input image with a second sharpening filter based on the first sharpening filter
wherein the second sharpening filter is generated by adjusting a correction amount for the input image by the first sharpening filter based on the gain information and noise information so that an adjustment amount for the correction amount increases as a gain of the first sharpening filter increases, and
wherein the gain information is information on an absolute value of frequency characteristics of the first sharpening filter.

11. The imaging apparatus according to claim 10,
wherein the imaging apparatus is configured in such a manner that a lens apparatus capable of communicating with the imaging apparatus and including the optical system is detachably attached to the imaging apparatus,
wherein the lens apparatus includes a storage unit configured to store information about the first sharpening filter, and
wherein the second acquisition task acquires the information about the first sharpening filter stored in the storage unit via communication, and acquires the first sharpening filter based on the information about the first sharpening filter.

12. A lens apparatus that is detachably attached to the imaging apparatus according to claim 11 and is capable of communicating with the imaging apparatus, the lens apparatus comprising:
an optical system; and
a storage unit configured to store information about the first sharpening filter of the optical system,
wherein the lens apparatus is configured to transmit information about the first sharpening filter to the imaging apparatus.

13. An image processing method comprising:
- acquiring noise information about a noise characteristic in an input image generated by image capturing using an optical system;
- acquiring a first sharpening filter in a real space, the first sharpening filter being based on an optical characteristic of the optical system;
- acquiring gain information about gain of the first sharpening filter using a sum of squares of components of the first sharpening filter, or acquiring gain information about gain of the first sharpening filter in a specific frequency using components of the first sharpening filter; and
- performing sharpening processing to generate an output image by convolving the input image with a second sharpening filter based on the first sharpening filter,
- wherein the gain information is acquired without using the input image,
- wherein the second sharpening filter is generated by adjusting a correction amount for the input image by the first sharpening filter based on the gain information and noise information so that an adjustment amount for the correction amount increases as a gain of the first sharpening filter increases, and
- wherein the gain information is information on an absolute value of frequency characteristics of the first sharpening filter.

14. A non-transitory computer-readable storage medium which is readable by a computer and on which a program that causes the computer to perform the image processing method according to claim 13 is recorded.

* * * * *